United States Patent
Fujita et al.

(10) Patent No.: US 7,836,693 B2
(45) Date of Patent: Nov. 23, 2010

(54) EXHAUST RECIRCULATION APPARATUS FOR ENGINE AND METHOD FOR CONTROLLING THE SAME

(75) Inventors: Tatsuya Fujita, Obu (JP); Hiroshi Haraguchi, Kariya (JP); Eiji Takemoto, Obu (JP)

(73) Assignee: Denso Corporation, Kariya (JP)

( * ) Notice: Subject to any disclaimer, the term of this patent is extended or adjusted under 35 U.S.C. 154(b) by 698 days.

(21) Appl. No.: 11/785,815

(22) Filed: Apr. 20, 2007

(65) Prior Publication Data

US 2007/0246028 A1 Oct. 25, 2007

(30) Foreign Application Priority Data

| Apr. 25, 2006 | (JP) | ............................ 2006-120147 |
| Aug. 21, 2006 | (JP) | ............................ 2006-224164 |

(51) Int. Cl.
*F02B 47/08* (2006.01)

(52) U.S. Cl. ............. 60/605.2; 123/568.11; 123/568.21

(58) Field of Classification Search ........................ 123/568.11–568.32; 60/605.2
See application file for complete search history.

(56) References Cited

U.S. PATENT DOCUMENTS

| 6,899,090 | B2 * | 5/2005 | Arnold .................. 123/568.12 |
| 6,973,786 | B1 * | 12/2005 | Liu et al. .................. 60/605.2 |
| 6,988,365 | B2 * | 1/2006 | Sasaki ...................... 60/605.2 |
| 7,013,879 | B2 * | 3/2006 | Brookshire et al. ..... 123/568.12 |
| 7,043,914 | B2 * | 5/2006 | Ishikawa .................. 60/605.2 |
| 7,165,540 | B2 * | 1/2007 | Brookshire et al. ..... 123/568.12 |
| 7,168,250 | B2 * | 1/2007 | Wei et al. .................. 60/605.2 |
| 7,261,098 | B2 * | 8/2007 | Vigild et al. ................ 123/704 |
| 7,284,366 | B2 * | 10/2007 | Kurtz .......................... 60/277 |
| 7,367,188 | B2 * | 5/2008 | Barbe et al. ................ 60/605.2 |
| 7,380,400 | B2 * | 6/2008 | Barbe et al. ................ 60/605.2 |
| 7,493,762 | B2 * | 2/2009 | Barbe et al. ................ 60/605.2 |
| 7,512,479 | B1 * | 3/2009 | Wang .......................... 701/103 |

FOREIGN PATENT DOCUMENTS

| JP | 07-293347 | 11/1995 |
| JP | 2002-021625 | 1/2002 |
| JP | 2004-150319 | 5/2004 |

* cited by examiner

*Primary Examiner*—Thomas Denion
*Assistant Examiner*—Douglas J. Duff
(74) *Attorney, Agent, or Firm*—Nixon & Vanderhye, PC

(57) ABSTRACT

An exhaust recirculation apparatus is provided to an engine. A high-pressure EGR passage branches from upstream of a turbine of a turbocharger in an exhaust system for recirculating exhaust gas to downstream of a compressor of the turbocharger in an intake system. A high-pressure EGR regulating unit controls exhaust gas through the high-pressure EGR passage. A low-pressure EGR passage branches from downstream of the turbine in the exhaust system for recirculating exhaust gas to upstream of the compressor in the intake system. A low-pressure EGR regulating unit controls exhaust gas through the low-pressure EGR passage. A control unit feedback-controls the high-pressure EGR regulating unit, and open-controls the low-pressure EGR regulating unit when exhaust gas is recirculated through the high-pressure EGR passage and the low-pressure EGR passage. The control unit feedback-controls the low-pressure EGR regulating unit when exhaust gas is recirculated through only the low-pressure EGR passage.

12 Claims, 13 Drawing Sheets

EXHAUST RECIRCULATION APPARATUS FOR ENGINE AND METHOD FOR CONTROLLING THE SAME

CROSS REFERENCE TO RELATED APPLICATIONS

This application is based on and incorporates herein by reference Japanese Patent Applications No. 2006-120147 filed on Apr. 25, 2006 and No. 2006-224164 filed on Aug. 21, 2006.

FIELD OF THE INVENTION

The present invention relates to an exhaust recirculation apparatus for an internal combustion engine. The present invention further relates to a method for controlling recirculation of exhaust gas of the internal combustion engine.

BACKGROUND OF THE INVENTION

For example, each of JP-A-2002-21625 and JP-A-2004-150319 discloses an exhaust recirculation apparatus (exhaust purification apparatus) for an internal combustion engine. Each exhaust recirculation apparatus performs high-pressure exhaust gas recirculation (high-pressure EGR) and low-pressure exhaust gas recirculation (low-pressure EGR). In the high-pressure EGR, exhaust gas is distributed from the upstream of a turbine of a turbocharger in an exhaust system, and recirculated into the downstream of a compressor of the turbocharger in an intake system. In the low-pressure EGR, exhaust gas is distributed from the downstream of the turbine in the exhaust system, and recirculated into the upstream of the compressor in the intake system. The exhaust recirculation apparatus switches between a combination EGR range, in which performing both the high-pressure EGR and the low-pressure EGR, and a low-pressure EGR range, in which performing only the low-pressure EGR, in accordance with load applied to the engine, or the like.

For example, in JP-A-7-293347, the exhaust recirculation apparatus obtains an EGR ratio of exhaust gas recirculation in accordance with change in an intake air mount when the exhaust gas recirculation (EGR) is started and terminated. The exhaust recirculation apparatus corrects a relationship between the EGR ratio and a control amount of the EGR in accordance with the EGR ratio. Thus, the exhaust recirculation apparatus is capable of accurately controlling the EGR. However, the exhaust recirculation apparatus in JP-A-7-293347 is provided to the engine having one EGR system, not having both of a high-pressure EGR system and a low-pressure EGR system.

An exhaust recirculation apparatus may be provided to an engine having both of a high-pressure EGR system and a low-pressure EGR system. However, in this structure, it is difficult to accurately control the amount of EGR around switching between the combination EGR range, in which both the high-pressure EGR and the low-pressure EGR are performed, and the low-pressure EGR range, in which only the low-pressure EGR is performed. Accordingly, in general, emission increases around the switching between the combination EGR range and the low-pressure EGR range.

SUMMARY OF THE INVENTION

The present invention addresses the above disadvantage. According to one aspect of the present invention, an exhaust recirculation apparatus for an internal combustion engine having a turbocharger for charging intake air, the exhaust recirculation apparatus including a high-pressure EGR passage branching from upstream of a turbine of the turbocharger in an exhaust system for recirculating exhaust gas to downstream of a compressor of the turbocharger in an intake system. The exhaust recirculation apparatus further includes a high-pressure EGR regulating unit for controlling a flow amount of exhaust gas recirculated through the high-pressure EGR passage. The exhaust recirculation apparatus further includes a low-pressure EGR passage branching from downstream of the turbine in the exhaust system for recirculating exhaust gas to upstream of the compressor in the intake system. The exhaust recirculation apparatus further includes a low-pressure EGR regulating unit for controlling a flow amount of exhaust gas recirculated through the low-pressure EGR passage. The exhaust recirculation apparatus further includes a control unit for controlling the high-pressure EGR regulating unit and the low-pressure EGR regulating unit. The control unit feedback-controls the high-pressure EGR regulating unit, and open-controls the low-pressure EGR regulating unit in a combination EGR range, in which exhaust gas is recirculated through the high-pressure EGR passage and the low-pressure EGR passage. The control unit feedback-controls the low-pressure EGR regulating unit in a low-pressure EGR range, in which exhaust gas is recirculated through substantially only the low-pressure EGR passage.

According to another aspect of the present invention, an exhaust recirculation apparatus for an internal combustion engine, the exhaust recirculation apparatus including a high-pressure EGR passage branching from an exhaust system of the internal combustion engine for recirculating exhaust gas to an intake system of the internal combustion engine. The exhaust recirculation apparatus further includes a high-pressure EGR regulating unit for controlling a flow amount of exhaust gas recirculated through the high-pressure EGR passage. The exhaust recirculation apparatus further includes a low-pressure EGR passage branching from downstream of the high-pressure EGR passage in the exhaust system for recirculating exhaust gas to the intake system. The exhaust recirculation apparatus further includes a low-pressure EGR regulating unit for controlling a flow amount of exhaust gas recirculated through the low-pressure EGR passage. The exhaust recirculation apparatus further includes a control unit for controlling the high-pressure EGR regulating unit and the low-pressure EGR regulating unit. The control unit feedback-controls one of the high-pressure EGR regulating unit and the low-pressure EGR regulating unit, and open-controls an other of the high-pressure EGR regulating unit and the low-pressure EGR regulating unit, in a combination EGR range, in which exhaust gas is recirculated through the high-pressure EGR passage and the low-pressure EGR passage.

According to another aspect of the present invention, an exhaust recirculation apparatus for an internal combustion engine, the exhaust recirculation apparatus including a high-pressure EGR passage branching from an exhaust system of the internal combustion engine for recirculating exhaust gas to an intake system of the internal combustion engine. The exhaust recirculation apparatus further includes a high-pressure EGR regulating unit for controlling a flow amount of exhaust gas recirculated through the high-pressure EGR passage. The exhaust recirculation apparatus further includes a low-pressure EGR passage branching from downstream of the high-pressure EGR passage in the exhaust system for recirculating exhaust gas to the intake system. The exhaust recirculation apparatus further includes a low-pressure EGR regulating unit for controlling a flow amount of exhaust gas recirculated through the low-pressure EGR passage. The exhaust recirculation apparatus further includes a control unit for controlling the high-pressure EGR regulating unit and the low-pressure EGR regulating unit. The control unit is adapted to feedback-controlling the high-pressure EGR regulating unit and the low-pressure EGR regulating unit. The control unit sets a control gain of the feedback control at zero in accordance with a range.

According to another aspect of the present invention, a method for controlling recirculation of exhaust gas of an internal combustion engine having a turbocharger, the method including feedback-controlling a flow amount of exhaust gas recirculated from upstream of a turbine of the turbocharger in an exhaust system to downstream of a compressor of the turbocharger in an intake system through a high-pressure EGR passage simultaneously with open-controlling a flow amount of exhaust gas recirculated from downstream of the turbine in the exhaust system to upstream of the compressor in the intake system through a low-pressure EGR passage when exhaust gas is recirculated through both the high-pressure EGR passage and the low-pressure EGR passage. The method further includes feedback-controlling the flow amount of exhaust gas recirculated through the low-pressure EGR passage when exhaust gas is recirculated through substantially only the low-pressure EGR passage.

According to another aspect of the present invention, a method for controlling recirculation of exhaust gas of an internal combustion engine, the method including recirculating of high-pressure exhaust gas from an exhaust system of the internal combustion engine to an intake system of the internal combustion engine through a high-pressure EGR passage simultaneously with recirculating low-pressure exhaust gas from downstream of the high-pressure EGR passage in the exhaust system to the intake system through a low-pressure EGR passage. The method further includes feedback-controlling one of a flow amount of the high-pressure exhaust gas and a flow amount of the low-pressure exhaust gas simultaneously with open-controlling an other of the flow amount of high-pressure exhaust gas and the flow amount of low-pressure exhaust gas.

According to another aspect of the present invention, a method for controlling recirculation of exhaust gas of an internal combustion engine, the method including recirculating high-pressure exhaust gas from an exhaust system of the internal combustion engine to an intake system of the internal combustion engine through a high-pressure EGR passage simultaneously with recirculating low-pressure exhaust gas from downstream of the high-pressure EGR passage in the exhaust system to the intake system through a low-pressure EGR passage. The method further includes feedback-controlling at least one of a flow amount of the high-pressure exhaust gas and a flow amount of the low-pressure exhaust gas. The method further includes setting a control gain of the feedback control at zero in accordance with a range.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
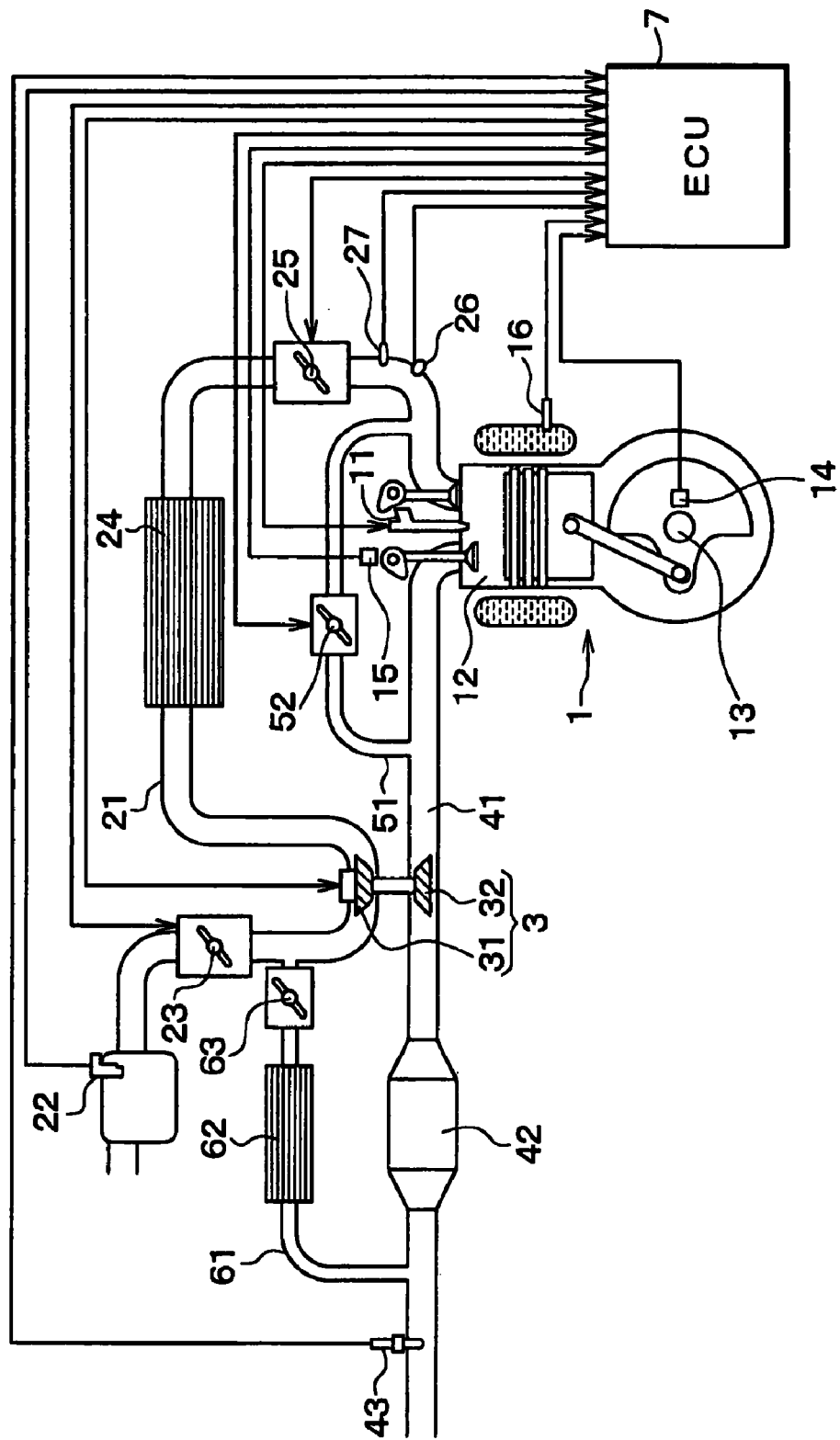
FIG. 1 is a schematic view showing an internal combustion engine provided with an exhaust recirculation apparatus according to a first embodiment.

As shown in FIG. 1, an internal combustion engine 1 includes therein an injector 11. In this embodiment, for example, the engine 1 is a diesel engine. The injector 11 is connected with an unillustrated common rail that accumulates high-pressure fuel. High-pressure fuel is supplied to the injector 11 through the common rail, so that the injector 11 injects the high-pressure fuel into a combustion chamber of the engine 1. The engine 1 includes a crank angle sensor 14, a cam angle sensor 15, and a water temperature sensor 16. The crank angle sensor 14 detects a rotative position of a crankshaft 13. The cam angle sensor 15 detects at least one of rotative positions of an inlet cam and an exhaust cam of the engine 1. The water temperature sensor 16 detects temperature of cooling water of the engine 1.

The engine 1 includes an intake/exhaust system provided with a turbocharger 3 for pressurizing, i.e., charging intake air drawn into a combustion chamber 12. The turbocharger 3 includes a compressor 31 and a turbine 32. The compressor 31 is arranged in an intake pipe 21 of the engine 1. The turbine 32 is arranged in an exhaust pipe 41 of the engine 1. The turbine 32 is driven by kinetic energy of exhaust gas, so that the turbine 32 rotates the compressor 31, so that the compressor 31 supercharges intake air. An unillustrated nozzle is provided in the vicinity of the compressor 31. Charging pressure of intake air can be controlled by changing an angular position of the nozzle.

An intake air sensor 22 and a low-pressure throttle 23 are provided in the intake pipe 21 upstream of the compressor 31 with respect to the flow direction of intake air. The intake air sensor 22 detects an amount of intake air. The low-pressure throttle 23 is adapted to communicating and blocking a passage in the intake pipe 21 to control an amount (EGR amount) of recirculated exhaust gas. An intercooler 24, a high-pressure throttle 25, an intake pressure sensor 26, and an intake-air temperature sensor 27 are provided in the intake pipe 21 downstream of the compressor 31 with respect to the flow direction of intake air. The intercooler 24 cools intake air. The high-pressure throttle 25 controls an amount of intake air. The intake pressure sensor 26 detects pressure of intake air. The intake-air temperature sensor 27 detects temperature of intake air.

A catalyst 42 is provided in the exhaust pipe 41 downstream of the turbine 32 with respect to the flow direction of exhaust gas. An oxygen sensor 43 is provided in the downstream of the catalyst 42. The oxygen sensor 43 detects concentration of oxygen in exhaust gas. The catalyst 42 is an oxidation catalyst for purifying exhaust gas by accelerating oxidation of HC and CO contained in exhaust gas. The catalyst 42 also collects particulate matter such as carbon particulate contained in exhaust gas.

The engine 1 includes two EGR passages 51, 61 through which exhaust gas is recirculated. Specifically, a high-pressure EGR passage 51 branches from the exhaust pipe 41 upstream of the turbine 32 with respect to the flow direction of exhaust gas. Exhaust gas flows through the high-pressure EGR passage 51, thereby being recirculated into the intake pipe 21 downstream of both the compressor 31 and the high-pressure throttle 25. The high-pressure EGR passage 51 is provided with a high-pressure EGR valve 52 for communicating and blocking the high-pressure EGR passage 51 to control the EGR amount. The high-pressure EGR valve 52 serves as a high-pressure EGR regulating unit.

A low-pressure EGR passage 61 branches from the exhaust pipe 41 downstream of both the turbine 32 and the catalyst 42 with respect to the flow direction of exhaust gas. Exhaust gas flows through the low-pressure EGR passage 61, thereby being recirculated into the intake pipe 21 upstream of the compressor 31. The exhaust gas is recirculated into the intake pipe 21 downstream of the low-pressure throttle 23 through the low-pressure EGR passage 61. The low-pressure EGR passage 61 is provided with an EGR cooler 62 and a low-pressure EGR valve 63. The EGR cooler 62 cools recirculated exhaust gas. The low-pressure EGR valve 63 is adapted to communicating and blocking the low-pressure EGR passage 61 to control the EGR amount.

The low-pressure throttle 23 also controls the EGR amount of exhaust gas recirculated through the low-pressure EGR passage 61. Specifically, the low-pressure throttle 23 communicates and blocks the passage in the intake pipe 21, so that differential pressure changes in the low-pressure EGR passage 61, thereby controlling the EGR amount of exhaust gas passing through the low-pressure EGR passage 61.

The low-pressure EGR valve 63 and the low-pressure throttle 23 serve as low-pressure EGR regulating units. The low-pressure throttle 23 further serves as a differential-pressure generating unit.

The above various kinds of sensors respectively output detection signals, and an ECU 7 inputs the detection signals. The ECU 7 includes a microcomputer having a generally known structure constructed of a CPU, a ROM, a RAM, an EEPROM (not shown), and the like. The ECU 7 conducts arithmetic processings in accordance with detection signals input from the various kinds of sensors, thereby controlling various components of the engine 1. Specifically, the ECU 7 controls the high-pressure EGR valve 52, the low-pressure EGR valve 63, and the low-pressure throttle 23, thereby conducting an EGR control. In addition, the ECU 7 manipulates the injector 11 to control an injection amount and an injection timing of fuel. The ECU 7 serves as a control unit.

The exhaust recirculation apparatus (exhaust purification apparatus) is provided for conducting an EGR control. The EGR control is described in reference to FIG. 2. In this embodiment, exhaust gas is recirculated as high-pressure EGR through the high-pressure EGR passage 51. In addition, exhaust gas is recirculated as low-pressure EGR through the low-pressure EGR passage 61.

Figure 2:
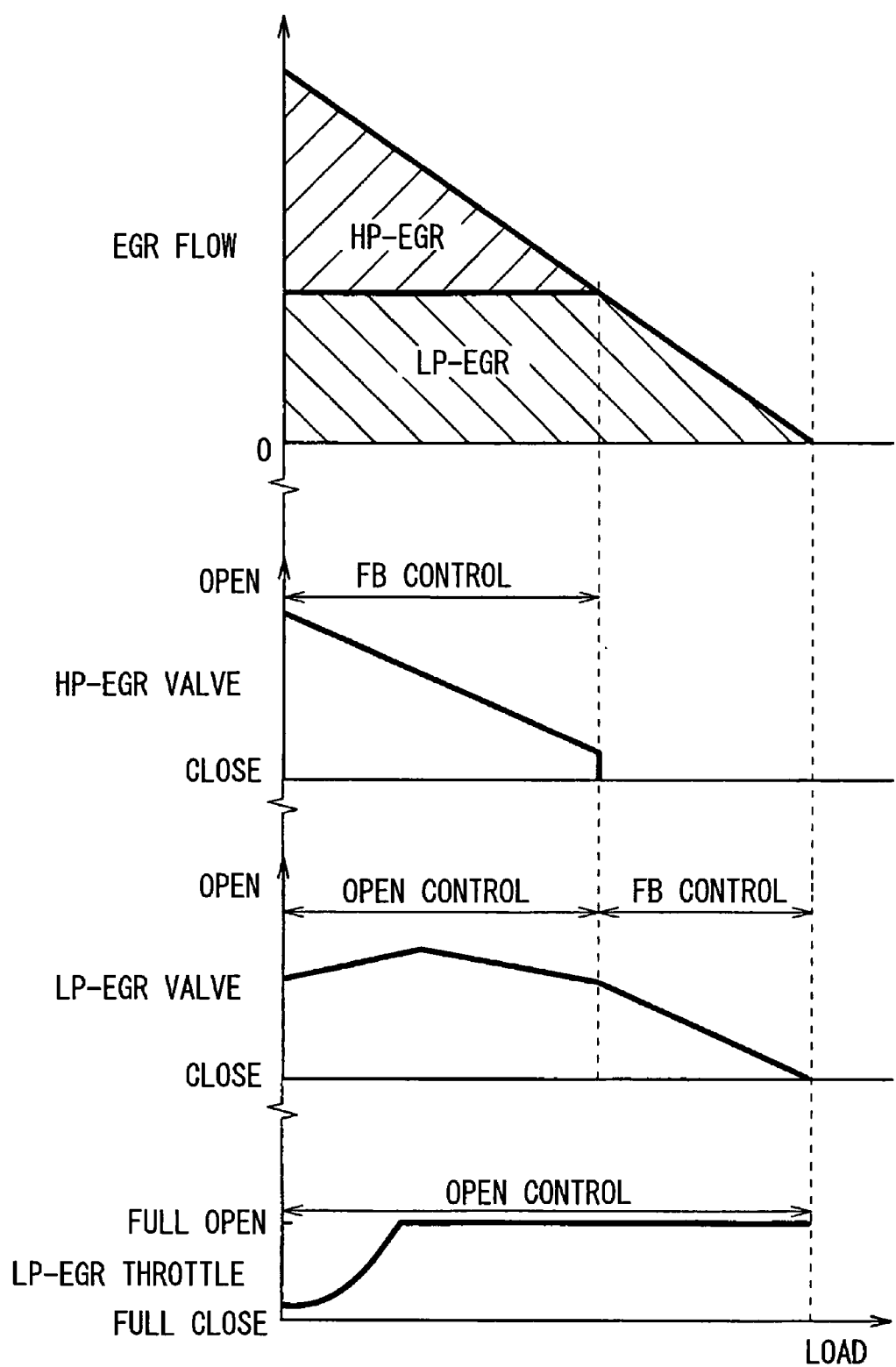
FIG. 2 is a view showing a relationship among load applied to the engine and parameters.

Referring to FIG. 2, the high-pressure EGR (HP-EGR) is recirculated in combination with the low-pressure EGR (LP-EGR) in a middle-low load range. Alternatively, only the low-pressure EGR is recirculated in a high load range. The ECU 7 calculates a total EGR amount by adding the EGR amount of the high-pressure EGR to the EGR amount of the low-pressure EGR. The ECU 7 decreases the total EGR amount with increase in the load.

The high-pressure EGR is recirculated in combination with the low-pressure EGR in a combination EGR range. In this combination EGR range, the ECU 7 open-controls the low-pressure EGR valve (LP-EGR valve) 63 and the low-pressure throttle (LP-EGR throttle) 23, such that the EGR amount of the low-pressure EGR becomes substantially constant regardless of the load. In this combination EGR range, the ECU 7 feedback-controls (FB controls) the high-pressure EGR valve 52 such that an air/fuel ratio, which is detected using the oxygen sensor 43, becomes substantially constant.

The ECU 7 recirculates only the low-pressure EGR in a low-pressure EGR range. In this low-pressure EGR range, the ECU 7 feedback-controls the low-pressure EGR valve 63, such that the air/fuel ratio, which is detected using the oxygen sensor 43, becomes substantially constant. That is, the ECU 7 regularly open-controls the low-pressure throttle 23.

The ECU 7 includes the ROM storing a data map defining a characteristic of the open control of the low-pressure EGR valve 63 and the open control of the low-pressure throttle 23.

In this embodiment, the ECU 7 conducts the feedback control to constantly maintain the air/fuel ratio in both the combination EGR range and the low-pressure EGR range. That is, the ECU 7 conducts the feedback control to the same controlled object in both the combination EGR range and the low-pressure EGR range. Therefore, the ECU 7 is capable of conducting the control around the switching, i.e., transition between the combination EGR range and the low-pressure EGR range, thereby accurately controlling the EGR amount, so that emission can be reduced.

The high-pressure EGR valve 52 has a control gain, which is defined by the change in the EGR amount with respect to the change in the throttle position of the high-pressure EGR valve 52. The low-pressure EGR valve 63 has a control gain, which is defined by the change in the EGR amount with respect to the change in the throttle position of the low-pressure EGR valve 63. The control gain of the high-pressure EGR valve 52 is different from the control gain of the low-pressure EGR valve 63 because of difference between the differential pressure around the high-pressure EGR valve 52 and the differential pressure around the low-pressure EGR valve 63. Specifically, the control gain of the high-pressure EGR valve 52 is greater than the control gain of the low-pressure EGR valve 63. The high-pressure EGR is recirculated after flowing for a high-pressure passage length, which is a length from the branch portion of the high-pressure EGR passage 51 to the combustion chamber 12 through the intake pipe 21. The low-pressure EGR is recirculated after flowing for a low-pressure passage length, which is a length from the branch portion of the low-pressure EGR passage 61 to the combustion chamber 12 through the intake pipe 21. The high-pressure passage length is less than the low-pressure passage length. The ECU 7 is capable of controlling the EGR amount at high control response in the combination EGR range by feedback-controlling the high-pressure EGR valve 52, which has the high control gain in the combination EGR range, in addition to the short high-pressure passage length. Therefore, emission of NOx and smoke can be reduced in, for example, accelerating the vehicle in the combination EGR range by feedback-controlling the high-pressure EGR valve 52.

In this embodiment, the low-pressure throttle 23 serves as the differential-pressure generating unit. Alternatively, an exhaust valve can be provided in the exhaust pipe 41 for communicating and blocking the exhaust pipe 41 downstream of the catalyst 42 with respect to the flow direction of exhaust gas. In this case, this exhaust valve serves as a differential-pressure generating unit. The exhaust valve communicates and blocks the passage in the exhaust pipe 41, so that differential pressure changes in the low-pressure EGR passage 61, thereby controlling the EGR amount through the low-pressure EGR passage 61.

Second Embodiment

In this embodiment, the control of the switching between the combination EGR range and the low-pressure EGR range in the first embodiment is modified.

Figure 3:
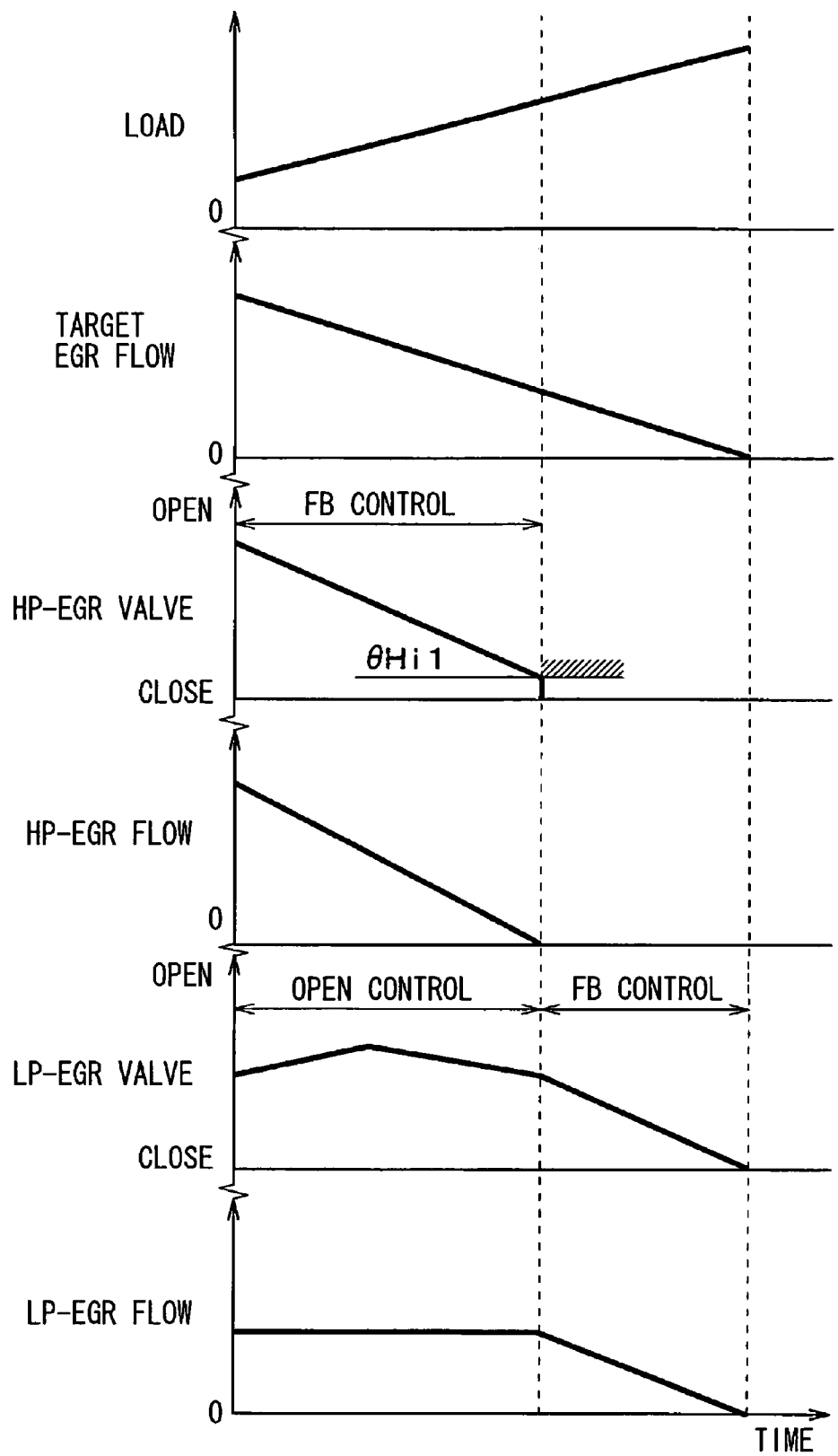
FIG. 3 is a time chart showing an EGR control of the exhaust recirculation apparatus when the load increases, according to a second embodiment.

As shown in FIG. 3, in the combination EGR range of the high-pressure EGR and the low-pressure EGR, the ECU 7 open-controls the low-pressure EGR valve (LP-EGR valve) 63 and feedback-controls the high-pressure EGR valve (HP-EGR valve) 52. In this combination EGR range, the ECU 7 open-controls the low-pressure throttle (LP-EGR throttle) 23, as unillustrated.

When the throttle position of the high-pressure EGR valve 52 becomes equal to or less than a predetermined value θHi1 with increase in the load, the ECU 7 controls the high-pressure EGR valve 52 at a full close position, and switches a feedback-controlled object to the low-pressure EGR valve 63. That is, the ECU 7 starts the feedback control of the low-pressure EGR valve 63. Thus, the control range (EGR control range) is switched to the low-pressure EGR range.

Figure 4:
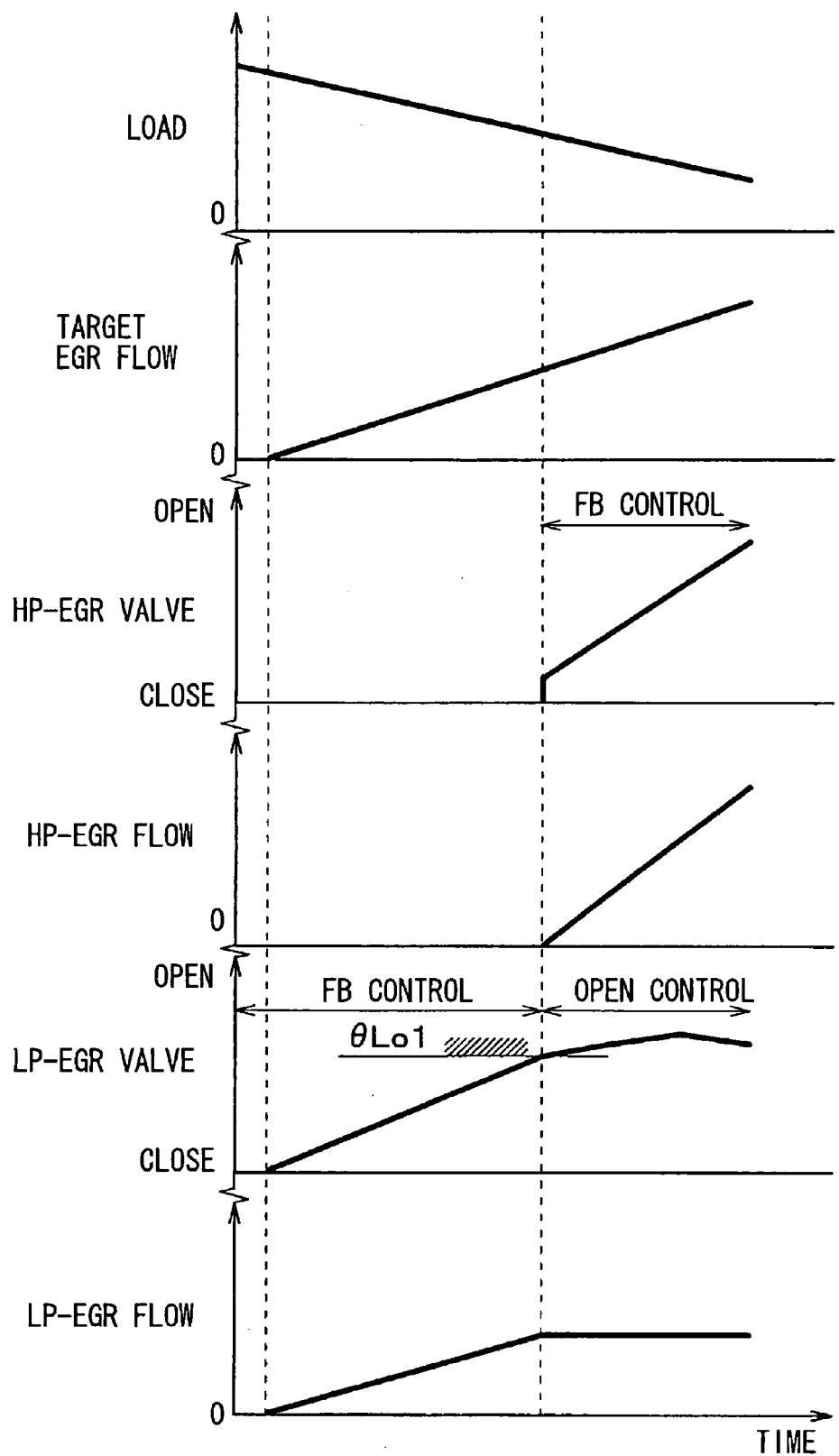
FIG. 4 is a time chart showing an EGR control of the exhaust recirculation apparatus when the load decreases, according to the second embodiment.

By contrast, as shown in FIG. 4, when the EGR range is in the low-pressure EGR range, the ECU 7 feedback-controls the low-pressure EGR valve 63. In this low-pressure EGR range, the ECU 7 open-controls the low-pressure throttle 23, as unillustrated.

When the throttle position of the low-pressure EGR valve 63 becomes equal to or greater than a predetermined value θLo1 with decrease in the load, the ECU 7 starts the open control of the low-pressure EGR valve 63 and switches the feedback-controlled object to the high-pressure EGR valve 52. Thus, the EGR control range is switched to the combination EGR range.

When each of the EGR valves 52, 63 is a poppet valve, each of the EGR valves 52, 63 may cause hunting in the control thereof in a low throttle position range. Alternatively, when each of the EGR valves 52, 63 is a butterfly valve, the region, in which the flow amount is nearly equal to zero, does not necessarily correspond to the full close position in which the throttle position of the butterfly valve is equal to 0°. In this embodiment, when the throttle position of the high-pressure EGR valve 52 becomes equal to or less than the predetermined value θHi1 with increase in the load (FIG. 3), the ECU 7 controls the high-pressure EGR valve 52 at the full close position, and switches the feedback-controlled object to the low-pressure EGR valve 63. Thus, the ECU 7 does not use the high-pressure EGR valve 52 for control of the EGR amount in the low throttle position range of the high-pressure EGR valve 52. In this operation, the control can be smoothly switched from the combination EGR range to the low-pressure EGR range, so that the ECU 7 is capable of accurately controlling the EGR amount, thereby reducing emission.

Third Embodiment

In this embodiment, the control of the switching between the combination EGR range and the low-pressure EGR range in the first embodiment is modified.

Figure 5:
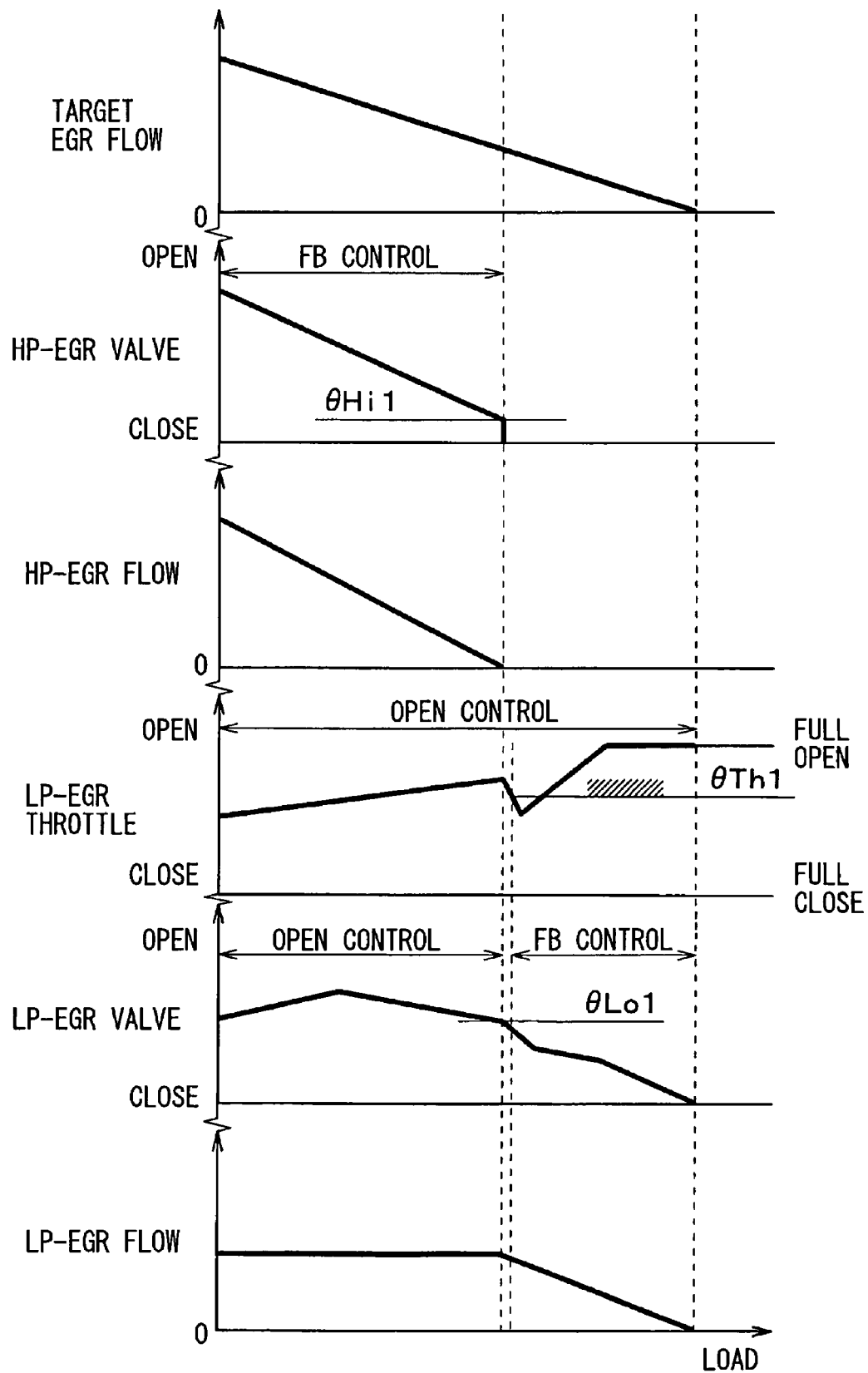
FIG. 5 is a view showing a relationship among the load applied to the engine and parameters, according to a third embodiment.

As shown in FIG. 5, in the combination EGR range of the high-pressure EGR and the low-pressure EGR, the ECU 7 open-controls both the low-pressure EGR valve 63 and the low-pressure throttle 23, and the ECU 7 feedback-controls the high-pressure EGR valve 52.

When the throttle position of the high-pressure EGR valve 52 becomes equal to or less than the predetermined value θHi1 with increase in the load, the ECU 7 controls the high-pressure EGR valve 52 at the full close position, and continues the open controls of the low-pressure EGR valve 63 and the low-pressure throttle 23. In this condition, when the throttle position of the high-pressure EGR valve 52 becomes equal to or less than the predetermined value θHi1, the ECU 7 once decreases the throttle position of the low-pressure throttle 23 with increase in the load, thereafter the ECU 7 increases the throttle position of the low-pressure throttle 23. When the throttle position of the low-pressure throttle 23 becomes equal to or less than a predetermined value θTh1 in a condition where the ECU 7 decreases the throttle position of the low-pressure throttle 23 with increase in the load, the ECU 7 starts the feedback control of the low-pressure EGR valve 63.

When the ECU 7 switches the feedback-controlled object from the high-pressure EGR valve 52 to the low-pressure EGR valve 63, the ECU 7 prohibits the feedback control in a period between the time point where the throttle position of the high-pressure EGR valve 52 becomes equal to or less than the predetermined value θHi1 and the time point where the throttle position of the low-pressure throttle 23 becomes equal to or less than the predetermined value θTh1. In this operation, the feedback-controlled objects can be restricted from being quickly switched from one another, so that the control of the ECU 7 can be stabilized.

Alternatively, when the ECU 7 switches the feedback-controlled object from the high-pressure EGR valve 52 to the low-pressure EGR valve 63, the ECU 7 may prohibit the feedback control for a predetermined period after the time point where the throttle position of the high-pressure EGR valve 52 becomes equal to or less than the predetermined value θHi1. In this operation, the feedback-controlled objects can be also restricted from being quickly switched from one another, so that the control of the ECU 7 can be also stabilized.

When the throttle position of the low-pressure EGR valve 63 becomes equal to or greater than a predetermined value θLo1 with decrease in the load in the low-pressure EGR range, the ECU 7 starts the open control of the low-pressure EGR valve 63 and switches the feedback-controlled object to the high-pressure EGR valve 52. Thus, the ECU 7 switches the EGR control range to the combination EGR range.

Fourth Embodiment

In this embodiment, the control of the switching between the combination EGR range and the low-pressure EGR range in the first embodiment is modified.

Figure 6:
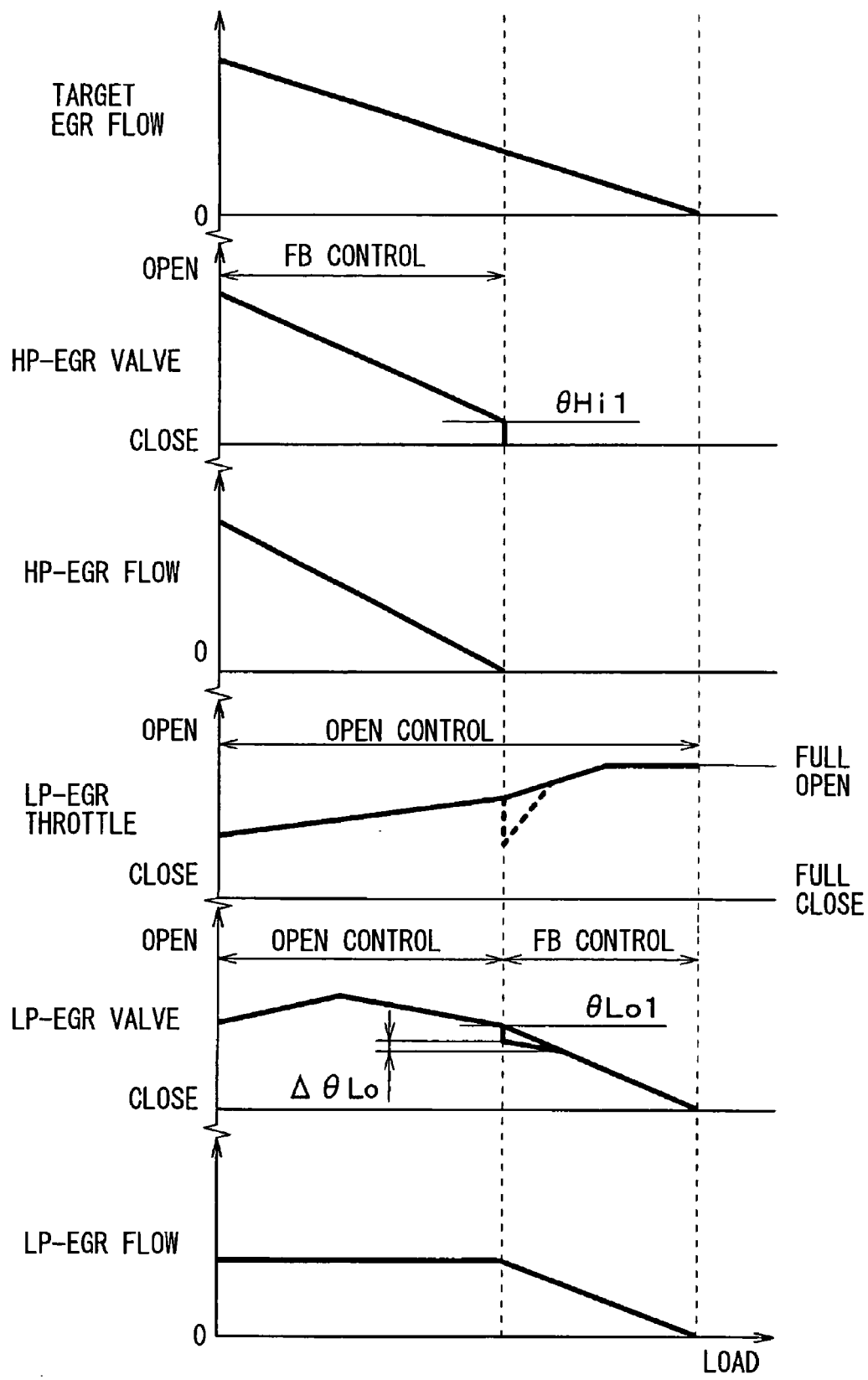
FIG. 6 is a view showing a relationship among the load applied to the engine and parameters, according to a fourth embodiment.

As shown in FIG. 6, in the combination EGR range of the high-pressure EGR and the low-pressure EGR, the ECU 7 open-controls both the low-pressure EGR valve 63 and the low-pressure throttle 23, and the ECU 7 feedback-controls the high-pressure EGR valve 52. When the throttle position of the high-pressure EGR valve 52 becomes equal to or less than the predetermined value θHi1 with increase in the load, the ECU 7 controls the high-pressure EGR valve 52 at the full close position, and starts the feedback control of the low-pressure EGR valve 63. The ECU 7 continues the open control of the low-pressure throttle 23.

The ECU 7 includes the ROM storing a data map defining a first throttle position characteristic and a second throttle position characteristic for obtaining the throttle position of the low-pressure throttle 23. In the low-pressure throttle position shown in FIG. 6, the solid line depicts the throttle position of the low-pressure throttle 23 obtained in accordance with the first throttle position characteristic, and the dotted line depicts the throttle position of the low-pressure throttle 23 obtained in accordance with the second throttle position characteristic. The first throttle position characteristic is used in a normal condition. The second throttle position characteristic is used in a predetermined period where the ECU 7 switches the feedback-controlled object from the high-pressure EGR valve 52 to the low-pressure EGR valve 63. The predetermined period is between the time point where the ECU 7 starts the use of the second throttle position characteristic and the time point where the throttle position of the low-pressure EGR valve 63 changes by a predetermined value ΔθLo.

The second throttle position characteristic is defined to be less than the first throttle position characteristic in throttle position. In the predetermined period where the ECU 7 switches the feedback-controlled object from the high-pressure EGR valve 52 to the low-pressure EGR valve 63, the ECU 7 starts controlling the low-pressure throttle 23 on the low-throttle position side compared with the normal condition, in addition to controlling the low-pressure EGR valve 63 on the low-throttle position side compared with the normal condition.

In this operation, a hysteresis can be defined between the switching of the feedback-controlled object from the high-pressure EGR valve 52 to the low-pressure EGR valve 63 and the switching of the feedback-controlled object from the low-pressure EGR valve 63 to the high-pressure EGR valve 52. Thus, the feedback-controlled objects can be also restricted from being quickly switched from one another, so that the control of the ECU 7 can be also stabilized.

Figure 7:
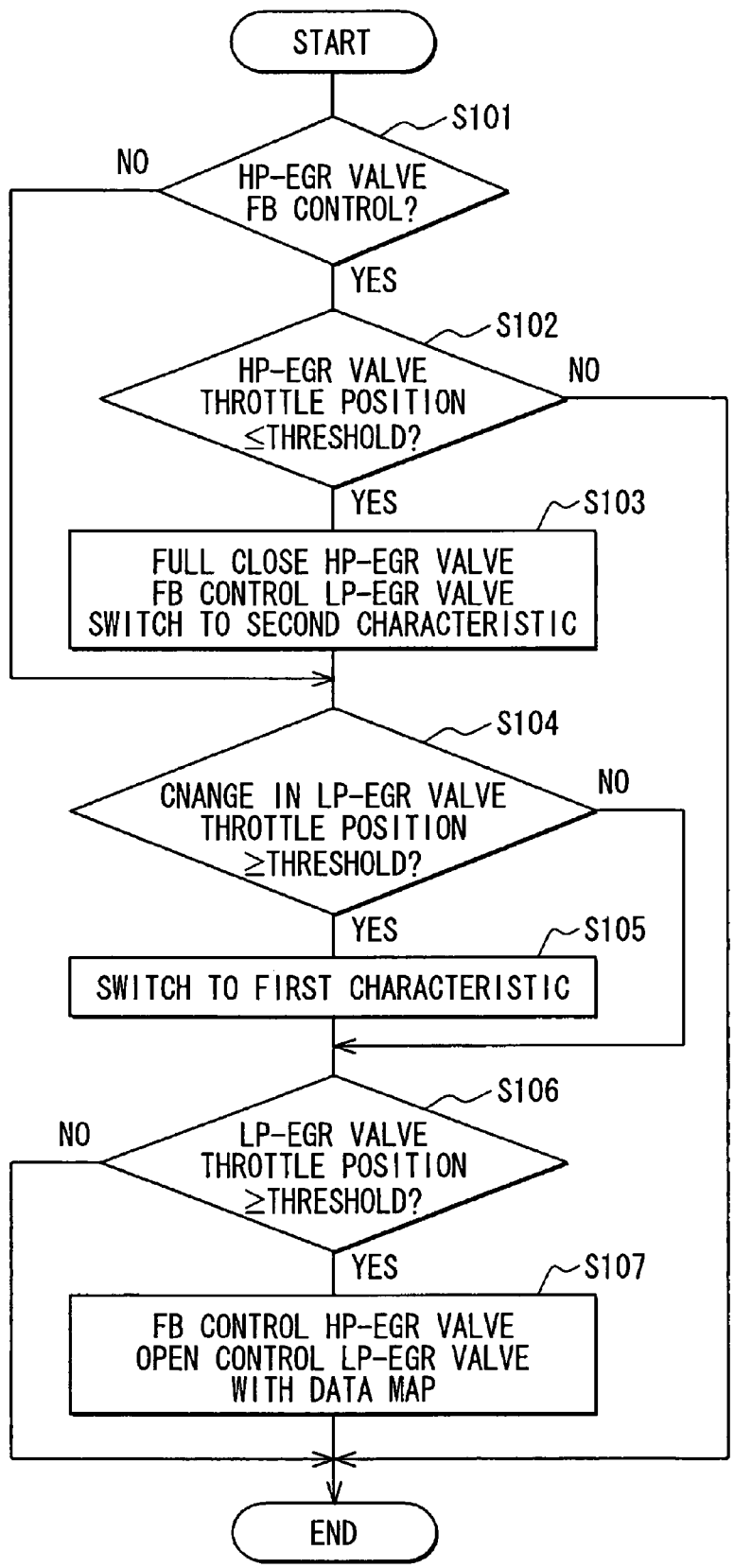
FIG. 7 is a flowchart showing a control for switching a feedback-controlled object of an ECU of the exhaust recirculation apparatus.

Next, the EGR control in this embodiment is described in reference to FIG. 7. A key switch is turned to the ON position for starting the engine 1, so that the ECU 7 is supplied with electricity to start executing of the control routine shown in FIG. 7 at regular intervals for switching the feedback-controlled object.

As shown in FIG. 7, when the ECU 7 feedback-controls the high-pressure EGR valve 52, step S101 makes a positive determination. When the throttle position of the high-pressure EGR valve 52 is greater than the predetermined value (threshold) θHi1, step S102 makes a negative determination, so that the ECU 7 continues the feedback control of the high-pressure EGR valve 52.

When the ECU 7 feedback-controls the high-pressure EGR valve 52, step S101 makes a positive determination, so that the routine proceeds to step S102. When the throttle position of the high-pressure EGR valve 52 is equal to or less than the predetermined value θHi1, step S102 makes a positive determination, so that the routine proceeds to step S103. In step S103, the ECU 7 controls the high-pressure EGR valve 52 at the full close position, and the ECU 7 switches the feedback-controlled object from the high-pressure EGR valve 52 to the low-pressure EGR valve 63. The ECU 7 switches the data map for obtaining the throttle position of the low-pressure throttle 23 to the second throttle position characteristic. When the throttle position of the low-pressure EGR valve 63 does not change by the predetermined value ΔθLo after using the second throttle position characteristic, step S104 makes a negative determination, so that the ECU 7 maintains the condition set in step S103. Alternatively, when the throttle position of the low-pressure EGR valve 63 is less than the predetermined value θLo1, step S106 makes a negative determination, so that the ECU 7 maintains the condition set in step S103.

When the ECU 7 feedback-controls the low-pressure EGR valve 63, step S101 makes a negative determination. Subsequently, when the throttle position of the low-pressure EGR valve 63 changes by the predetermine value ΔθLo or greater, step S104 makes a positive determination. In this condition, the routine proceeds to step S105, in which the ECU 7 changes the data map for obtaining the throttle position of the low-pressure throttle 23 to the first throttle position characteristic. When the throttle position of the low-pressure EGR valve 63 is less than the predetermined value θLo1, step S106 makes a negative determination, so that the ECU 7 controls the high-pressure EGR valve 52 at the full close position, and feedback-controls the low-pressure EGR valve 63, in addition to maintaining using of the first throttle position characteristic.

When the ECU 7 feedback-controls the low-pressure EGR valve 63, step S101 makes a negative determination. Subsequently, when the throttle position of the low-pressure EGR valve 63 is equal to or greater than the predetermined value θLo1, step S106 makes a positive determination, so that the routine proceeds to step S107. In step S107, the ECU 7 switches the feedback-controlled object from the low-pressure EGR valve 63 to the high-pressure EGR valve 52. In addition, the ECU 7 starts the open control of the low-pressure EGR valve 63 in accordance with the data map.

In this embodiment, the ECU 7 starts using the first throttle position characteristic when the throttle position of the low-pressure EGR valve 63 changes by the predetermined value ΔθLo after using the second throttle position characteristic. Alternatively, the ECU 7 may start using the first throttle position characteristic when a predetermined time elapses after starting the use of the second throttle position characteristic.

Fifth Embodiment

Figure 8:
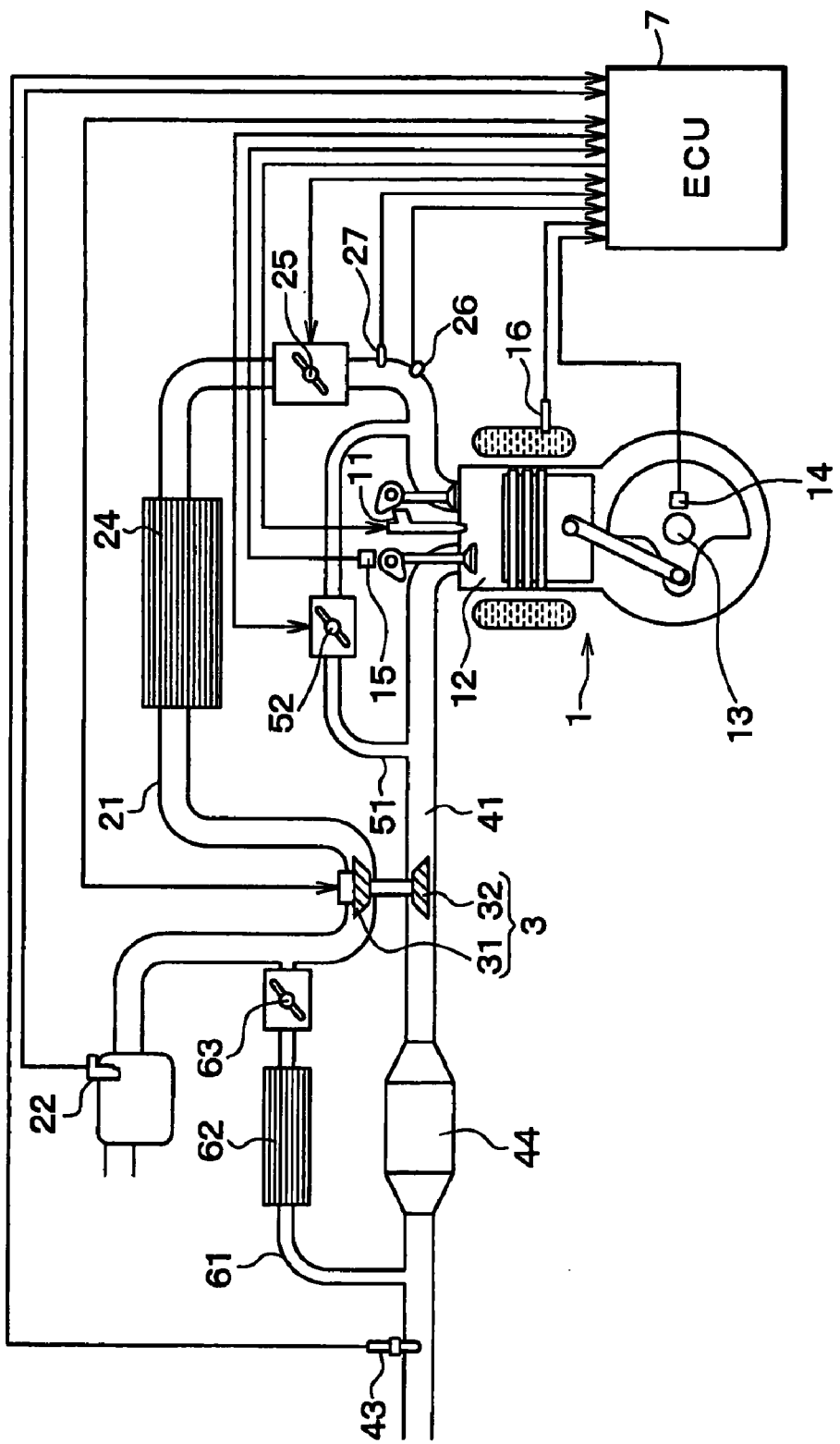
FIG. 8 is a schematic view showing an internal combustion engine provided with an exhaust recirculation apparatus according to a fifth embodiment.

In this embodiment, as shown in FIG. 8, the low-pressure throttle 23 and the catalyst 42 are omitted from the structure in the first embodiment. A collecting device 44 is provided in the exhaust pipe 41 downstream of the turbine 32 with respect to the flow direction of exhaust gas. The collecting device 44 is arranged upstream of the low-pressure EGR passage 61. The collecting device 44 is provided for collecting particulate matter such as carbon particulate contained in exhaust gas. In addition, as described below, the EGR control in this embodiment is different from that in the first embodiment.

Figure 9:
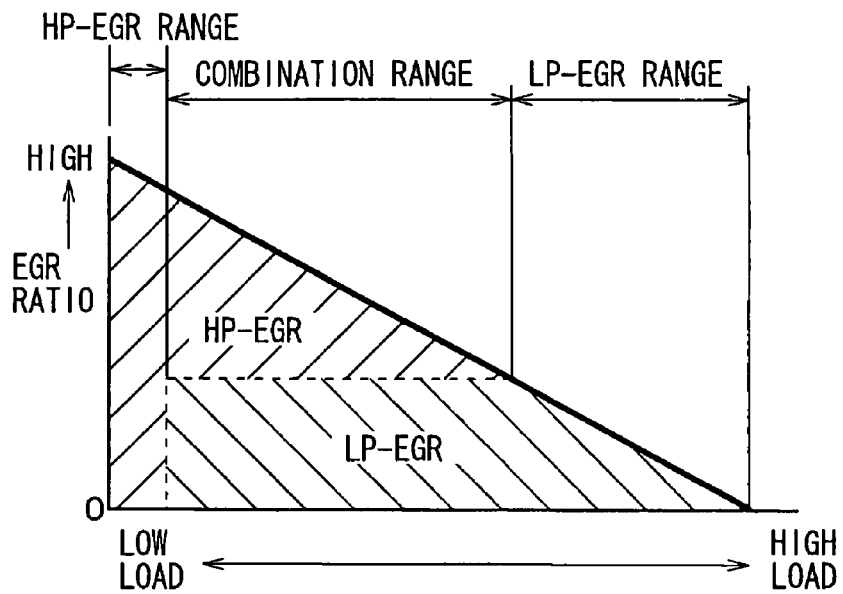
FIG. 9 is a view showing a relationship between load applied to the engine and an EGR ratio.

As shown in FIG. 9, only the high-pressure EGR is recirculated in the low load range (HP-EGR range). The high-pressure EGR is recirculated in combination with the low-pressure EGR in the middle load range (combination range). Only the low-pressure EGR is recirculated in the high load range (LP-EGR range). The ECU 7 decreases an EGR ratio with increase in the load applied to the engine 1.

The ECU 7 recirculates only the high-pressure EGR in a high-pressure EGR range. In this high-pressure EGR range, the ECU 7 feedback-controls the high-pressure EGR valve 52, such that the air/fuel ratio, which is detected using the oxygen sensor 43, becomes substantially constant.

The high-pressure EGR is recirculated in combination with the low-pressure EGR in the combination EGR range. In this combination EGR range, the ECU 7 open-controls the low-pressure EGR valve 63, such that the EGR ratio of the low-pressure EGR becomes substantially constant regardless of the load. In this combination EGR range, the ECU 7 feedback-controls the high-pressure EGR valve 52 such that an air/fuel ratio, which is detected using the oxygen sensor 43, becomes substantially constant.

Figure 11:
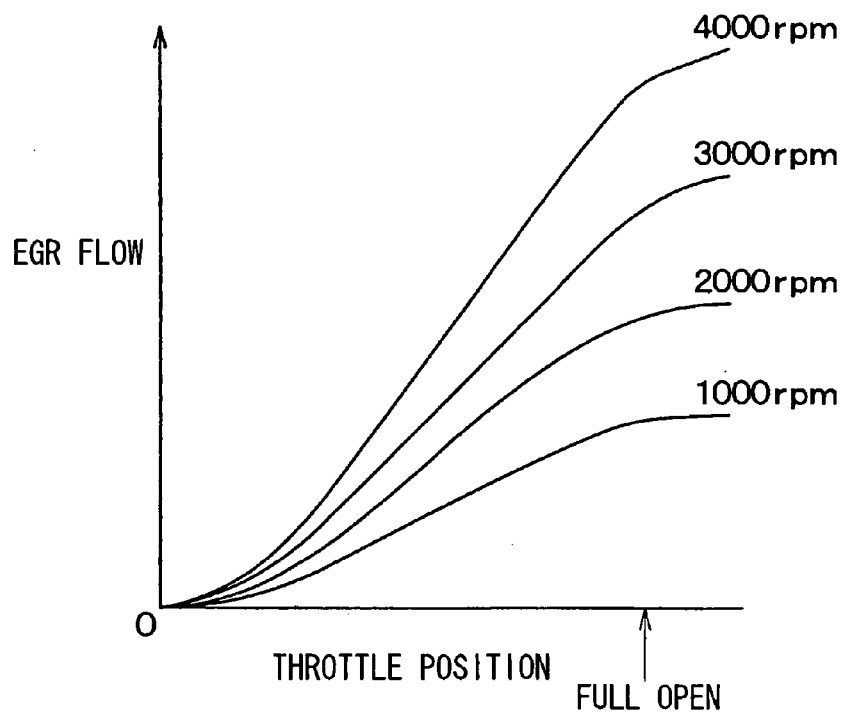
FIG. 11 is a graph showing a relationship between a throttle position of a low-pressure EGR valve and a low-pressure EGR amount, according to the fifth embodiment.

The ECU 7 includes the EEPROM storing a data map shown in FIG. 11. The data map is a throttle-position/flow-amount reference map defining a relationship between the throttle position of the low-pressure EGR valve 63 and the flow amount of the low-pressure EGR. More specifically, as show in FIG. 12, the throttle-position/flow-amount reference map defines information (throttle/flow information) between the throttle position and the flow amount for each rotation speed of the engine 1. The throttle-position/flow-amount reference map shown in FIG. 12 defines the throttle/flow information for 3000 rpm of the rotation speed. The throttle/flow information includes a normal flow range of the low-pressure EGR defined in consideration of components tolerance of the low-pressure EGR valve 63. The ECU 7 obtains the throttle position of the low-pressure EGR valve 63 when open-controlling the low-pressure EGR valve 63 from the throttle-flow information in accordance with a target amount of the low-pressure EGR.

In the low-pressure EGR range, the ECU 7 feedback-controls the low-pressure EGR valve 63, such that the air/fuel ratio, which is detected using the oxygen sensor 43, becomes substantially constant.

Figure 10:
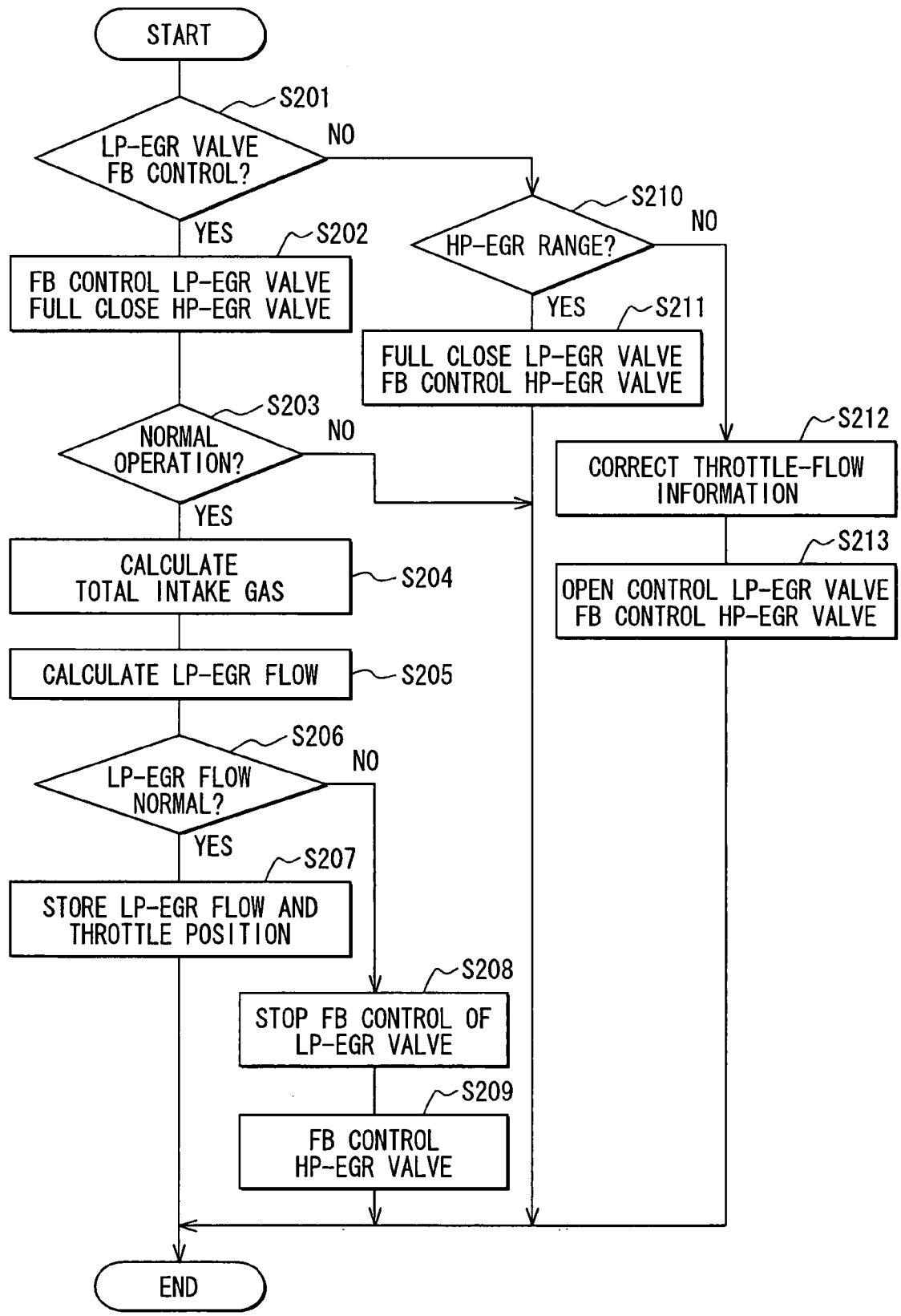
FIG. 10 is a flowchart showing an EGR control according to a fifth embodiment.

The key switch is turned to the ON position for starting the engine 1, so that the ECU 7 is supplied with electricity to start executing of the control routine shown in FIG. 10 at regular intervals.

First, the EGR control using only the low-pressure EGR is described. Referring to FIG. 10, in step S201, the ECU 7 evaluates whether the ECU 7 feedback-controls the low-pressure EGR valve 63 in the present region. Specifically, when the engine 1 is applied with high load, step S201 makes a positive determination, so that the routine proceeds to step S202. In step S202, the ECU 7 controls the high-pressure EGR valve 52 at the full close position, and feedback-controls the low-pressure EGR valve 63.

Subsequently, in step S203, the ECU 7 evaluates whether the engine 1 is in a normal operation. Specifically, when change in the rotation speed of the engine 1 and/or load applied to the engien 1 is small, the ECU 7 determines the engine 1 to be in the normal operation, so that step S203 makes a positive determination. When step S203 makes a positive determination, the routine proceeds to step S204 where the ECU 7 obtains the information for correcting the characteristic shown in FIG. 11.

In step S204, the ECU 7 calculates a total intake gas amount indicating the amount of gas drawn into the combustion chamber 12 of the engine 1 in accordance with the rotation speed, the intake pressure, the atmospheric pressure, and the charging efficiency, in reference to the formula (1). The total intake gas amount is the sum of the amount (intake air amount) of intake air (fresh intake air) and the EGR amount.

total intake gas amount (g/sec)=amount of gas (g) for one rotation×rotation speed (rpm)×intake pressure/atmospheric pressure The amount of gas for one rotation can be calculated from the volume of the cylinder of the engine, the charging efficiency, and the like. The charging efficiency can be obtained from a data map defining the relationship between the rotation speed of the engine 1 and the load applied to the engine 1.

Subsequently, in step S205, the ECU 7 calculates a low-pressure EGR amount by subtracting the intake air amount from the total intake gas amount.

Subsequently, in step S206, the ECU 7 evaluates whether the low-pressure EGR amount is in the normal flow range. When the low-pressure EGR amount is in the normal flow range shown in FIG. 12, step S206 makes a positive determination, so that the routine proceeds to step S207.

In step S207, the ECU 7 stores the low-pressure EGR amount calculated in step S205, the throttle position of the low-pressure EGR valve 63, and the rotation speed of the engine 1 at the moment. The ECU 7 uses the information stored in step S207 when the ECU 7 corrects the throttle-flow information stored in the ECU 7 in step S212.

The ECU 7 once terminates the EGR control shown in FIG. 10 after executing the process in step S207.

When step S203 makes a negative determination, that is, when change in the rotation speed of the engine 1 and/or load applied to the engien 1 is large, the ECU 7 cannot accurately calculate the low-pressure EGR amount and the like. Therefore, the ECU 7 terminates the EGR control shown in FIG. 10 without executing the process of step S204.

Furthermore, when step S206 makes a negative determination, that is, the low-pressure EGR amount is out of the normal flow range, the ECU 7 determines the low-pressure EGR system to cause a malfunction such as abnormality of the low-pressure EGR valve 63. Thus, the routine proceeds to step S208.

In step S208, the ECU 7 stops the feedback control of the low-pressure EGR valve 63, and controls the low-pressure EGR valve 63 at the full close position. Subsequently, in step S209, the ECU 7 starts feedback control of the high-pressure EGR valve 52, so that the ECU 7 continues the EGR control using the high-pressure EGR system, which is not determined to be abnormal.

The ECU 7 once terminates the EGR control shown in FIG. 10 after executing the process in step S209.

Subsequently, the EGR control using only the high-pressure EGR is described. In this case, step S201 makes a negative determination, so that the routine proceed to step S210 where the ECU 7 evaluates whether the ECU 7 uses only the high-pressure EGR in the present region. Specifically, when the engine 1 is applied with low load, step S210 makes a positive determination, so that the routine proceeds to step S211. In step S211, the ECU 7 controls the low-pressure EGR valve 63 at the full close position, and feedback-controls the high-pressure EGR valve 52.

The ECU 7 once terminates the EGR control shown in FIG. 10 after executing the process in step S211.

Subsequently, the EGR control using the high-pressure EGR in combination with the low-pressure EGR is described. Specifically, when the engine 1 is applied with middle load, steps S201, S210 make negative determinations, so that the routine proceeds to step S212.

Figure 12:
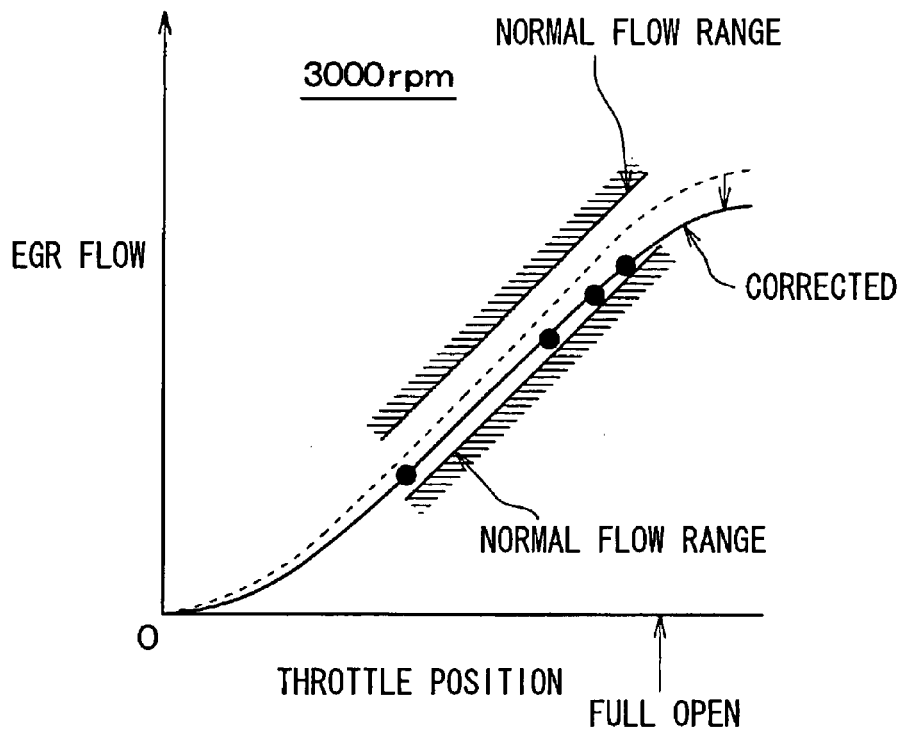
FIG. 12 is a graph showing an example relationship between the throttle position of the low-pressure EGR valve and the low-pressure EGR amount at a specific rotation speed of the engine, according to the fifth embodiment.

In step S212, the ECU 7 corrects the throttle-flow information, which is stored in the ECU 7, using the information stored in step S207. Specifically, for example, as shown in FIG. 12, the ECU 7 updates the throttle-flow information on the basis of the number of information items, as depicted by filled circles, stored in step S207. Thus, the ECU 7 stores the updated throttle-flow information.

Subsequently, in step S213, the ECU 7 open-controls the low-pressure EGR valve 63 using the present throttle-flow information updated in step S212, and feedback-controls the high-pressure EGR valve 52.

The ECU 7 once terminates the EGR control shown in FIG. 10 after executing the process in step S213.

In this embodiment, the ECU 7 feedback-controls the high-pressure EGR, and open-controls the low-pressure EGR in the combination EGR range. That is, the ECU 7 does not feedback-control the high-pressure EGR simultaneously with the low-pressure EGR. Therefore, the EGR control can be simplified.

In addition, the low-pressure EGR passage 61 branches from the downstream of the collecting device 44. Therefore, exhausted particulate matter is removed from exhaust gas trough the collecting device 44, and the exhaust gas is recirculated into the intake pipe 21. Thus, the compressor 31 and the intercooler 24 can be protected from pollution.

The ECU 7 obtains the relationship between the low-pressure EGR amount and the throttle position of the low-pressure EGR valve 63 when the ECU 7 controls the high-pressure EGR valve 52 at the full close position, so that the ECU 7 is capable of accurately obtaining the relationship.

In addition, when the ECU 7 corrects to update the throttle-flow information in the period where the ECU 7 feedback-controls the low-pressure EGR valve 63, drivability of the vehicle may be degraded. In this embodiment, the ECU 7 corrects the throttle-flow information after starting the open control of the low-pressure EGR valve 63. Therefore, drivability of the vehicle can be maintained.

Furthermore, when the low-pressure EGR amount is out of the normal flow range, the ECU 7 determines the low-pressure EGR system to cause a malfunction such as abnormality of the low-pressure EGR valve 63. Thus, the ECU 7 controls the low-pressure EGR valve 63 at the full close position, and feedback-controls the high-pressure EGR valve 52, which is not determined to cause a malfunction. Thus, production of NOx can be restricted.

Furthermore, the ECU 7 corrects the throttle-flow information relevant to the low-pressure EGR valve 63, so that temperature of gas in the intake manifold can be stabilized as described below. Thus, emission of NOx can be reduced.

Figure 13:
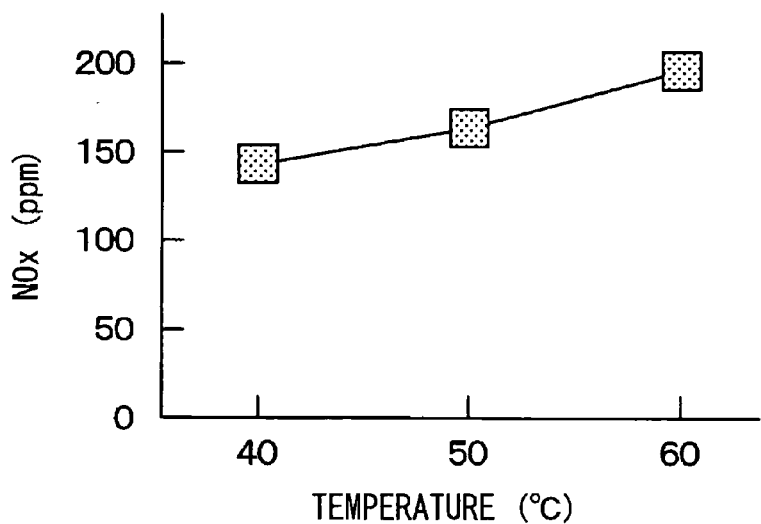
FIG. 13 is a graph showing a relationship between temperature of gas in an intake manifold of the engine and concentration of NOx, according to the fifth embodiment.

As shown in FIG. 13, when the temperature of gas in the intake manifold increases in the same operating condition, production of NOx increases. When a mixture rate of high-pressure EGR increases in the combination EGR range, the temperature of gas increases in the intake manifold, and consequently, production of NOx increases. The mixture rate of the high-pressure EGR increases when the low-pressure EGR amount becomes less than a target amount in a condition where the ECU 7 open-controls the low-pressure EGR valve 63.

In this embodiment, the ECU 7 corrects the throttle-flow information relevant to the low-pressure EGR valve 63 by obtaining the relationship between the low-pressure EGR amount and the throttle position of the low-pressure EGR valve 63. Therefore, the ECU 7 is capable of controlling the low-pressure EGR amount substantially at the target amount in a condition where the ECU 7 open-controls the low-pressure EGR valve 63. Therefore, the ECU 7 is capable of maintaining the mixture rate between the low-pressure EGR and the high-pressure EGR, thereby stabilizing the temperature of gas in the intake manifold. Thus, emission of NOx can be reduced.

In this embodiment, the ECU 7 feedback-controls the high-pressure EGR, and open-controls the low-pressure EGR in the combination EGR range. Alternatively, the ECU 7 may feedback-control the low-pressure EGR, and may open-control the high-pressure EGR in the combination EGR range.

In this embodiment, the ECU 7 determines the low-pressure EGR system to cause a malfunction such as abnormality of the low-pressure EGR valve 63 when the low-pressure EGR amount is out of the normal flow range. Alternatively, the ECU 7 may determine the high-pressure EGR system to cause a malfunction such as abnormality of the high-pressure EGR valve 52 when the high-pressure EGR amount is out of the normal flow range. In this condition, the ECU 7 controls the high-pressure EGR valve 52 at the full close position, and feedback-controls the low-pressure EGR valve 63, which is not determined to cause a malfunction.

Sixth Embodiment

In this embodiment, the ECU7 includes the ROM storing the throttle-flow information defining a relationship between an initial value of the throttle position of the low-pressure EGR valve 63 and the low-pressure EGR amount for each rotation speed of the engine 1.

Figure 14:
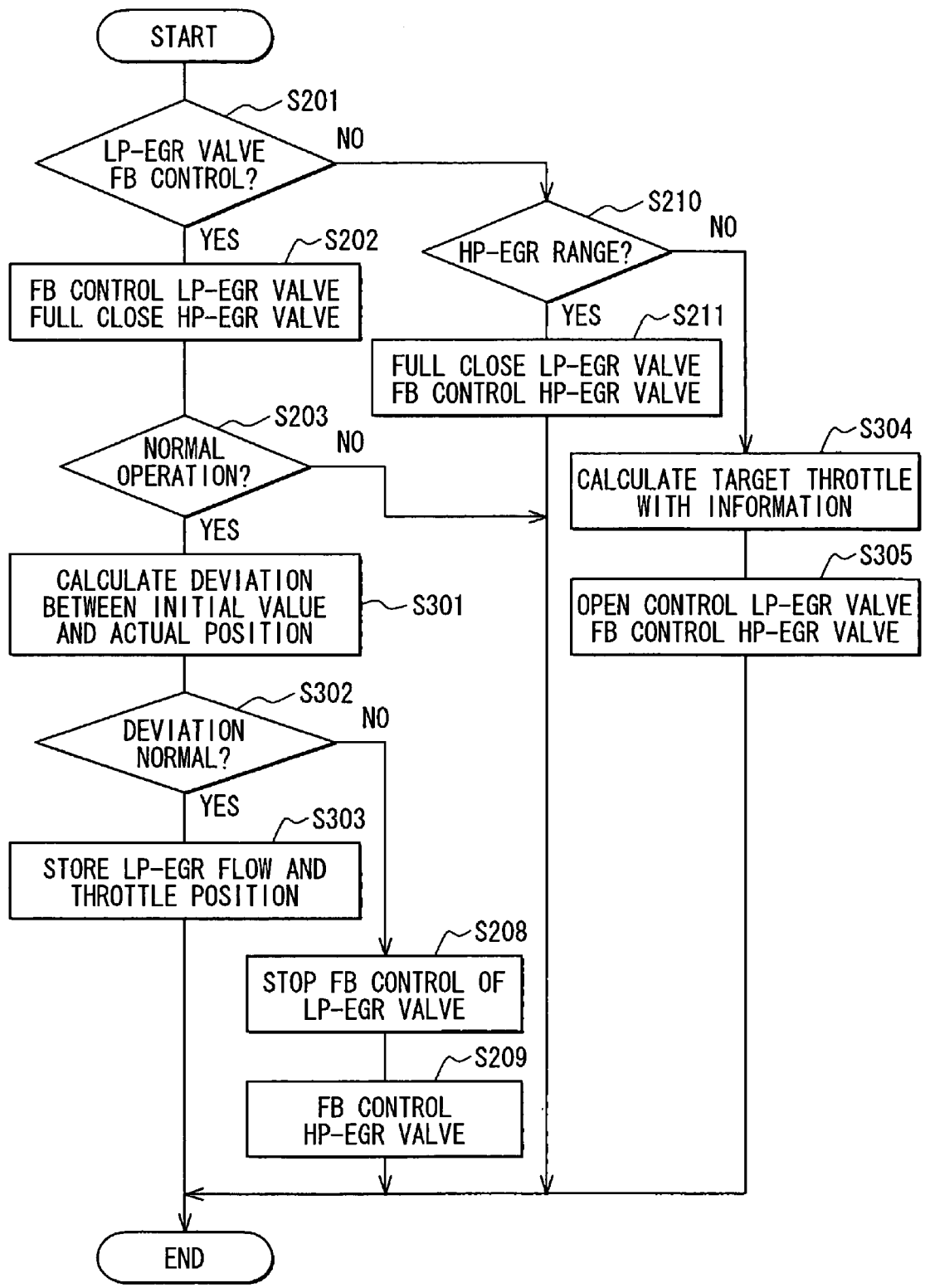
FIG. 14 is a flowchart showing an EGR control of an exhaust recirculation apparatus according to a sixth embodiment.

As shown in FIG. 14, when the ECU 7 feedback-controls the low-pressure EGR valve 63 in the present region, step S201 makes a positive determination. Subsequently, when the engine 1 is in a normal operation, step S203 makes a positive determination, so that the routine proceeds to step S301.

In step S301, the ECU 7 calculates the deviation between the initial value of the throttle position of the low-pressure EGR valve 63 and the actual throttle position of the low-pressure EGR valve 63. Subsequently, in step S302, the ECU 7 evaluates whether the deviation is within a predetermined range. When the deviation is in the predetermined range, step S302 makes a positive determination, so that the routine proceeds to step S303.

In step S303, the ECU 7 stores the deviation calculated in step S301, the throttle position of the low-pressure EGR valve 63, the low-pressure EGR amount, and the rotation speed of the engine 1 at the moment.

When step S302 makes a negative determination, that is, the deviation calculated in step S301 is out of the predetermined range, the ECU 7 determines the low-pressure EGR system causes a malfunction such as abnormality of the low-pressure EGR valve 63. Thus, the routine proceeds to step S208.

Subsequently, the EGR control using the high-pressure EGR in combination with the low-pressure EGR is described. When the engine 1 is applied with middle load, steps S201, S210 make negative determinations, so that the routine proceeds to step S304.

In step S304, the ECU 7 calculates the target throttle position in the open control of the low-pressure EGR valve 63 on the basis of the information stored in step S303 and the throttle-flow information stored in the ECU 7. Specifically, the ECU 7 obtains a provisional target throttle position of the low-pressure EGR valve 63 in reference to the throttle-flow information on the basis of the target amount of the low-pressure EGR. The ECU 7 corrects the provisional target throttle position in accordance with the deviation calculated in step S301, thereby calculating the target throttle position of the low-pressure EGR valve 63.

Subsequently, in step S305, the ECU 7 open-controls the low-pressure EGR valve 63 at the target throttle position calculated in step S304, and feedback-controls the high-pressure EGR valve 52.

In this embodiment, when the ECU 7 calculates the target throttle position in the open control of the low-pressure EGR valve 63, the ECU 7 corrects the target throttle position in accordance with the deviation between the initial value of the throttle position of the low-pressure EGR valve 63 and the actual throttle position of the low-pressure EGR valve 63. Therefore, the ECU 7 is capable of controlling the low-pressure EGR amount substantially at the target amount in a condition where the ECU 7 open-controls the low-pressure EGR valve 63. Therefore, the ECU 7 is capable of maintaining the mixture rate between the low-pressure EGR and the high-pressure EGR, thereby stabilizing the temperature of gas in the intake manifold. Thus, emission of NOx can be reduced.

Furthermore, the ECU 7 need not forcedly manipulate the low-pressure EGR valve 63 for calculating the deviation between the initial value of the throttle position of the low-pressure EGR valve 63 and the actual throttle position of the low-pressure EGR valve 63. Therefore, influence to the drivability of the vehicle is small.

In this embodiment, in step S304, the ECU 7 corrects the target throttle position in the open control of the low-pressure EGR valve 63, in accordance with the deviation between the initial value of the throttle position of the low-pressure EGR valve 63 and the actual throttle position of the low-pressure EGR valve 63. Alternatively, the ECU 7 may correct the target throttle position in the open control of the low-pressure EGR valve 63 in accordance with a feedback correction amount used when the ECU 7 feedback-controls the low-pressure EGR valve 63 in step S202.

Seventh Embodiment

In this embodiment, the EGR control in the fifth embodiment is modified. The structure of the exhaust recirculation apparatus in this embodiment is substantially the same as the structure of the fifth embodiment.

In this embodiment, the ECU 7 feedback-controls both the high-pressure EGR valve 52 and the low-pressure EGR valve 63. In addition, the ECU 7 sets the feedback amount of the high-pressure EGR valve 52 at zero, so that the ECU 7 substantially does not feedback-control the high-pressure EGR valve 52 in the EGR control range where only the high-pressure EGR is recirculated.

Figure 15:
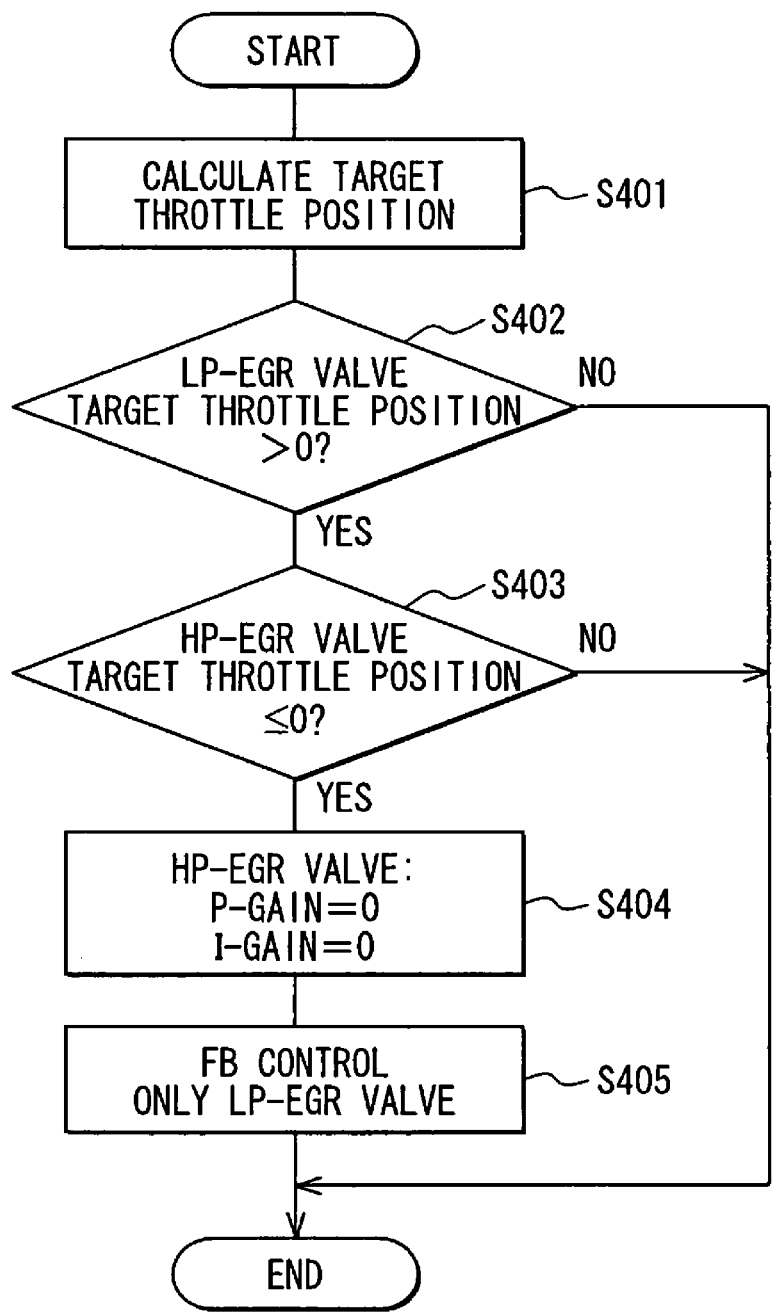
FIG. 15 is a flowchart showing an EGR control of an exhaust recirculation apparatus according to a seventh embodiment.

As follows, the EGR control in the EGR control range where only the low-pressure EGR is recirculated is described in reference to FIG. 15. In step S401, the ECU 7 calculates the target throttle position of the high-pressure EGR valve 52 and the target throttle position of the low-pressure EGR valve 63 in accordance with the rotation speed of the engine 1, the fuel injection amount, and the cooling water temperature.

Subsequently, in step S402, when the target throttle position of the low-pressure EGR valve 63 becomes greater than zero, step S402 makes a positive determination, so that the routine proceeds to step S403. In step S403, when the target throttle position of the high-pressure EGR valve 52 becomes equal to or less than zero, step S403 makes a positive determination, so that the routine proceeds to step S404. In step S404, the ECU 7 sets both a proportional gain (P gain) and an integral gain (I gain) of the PI control at zero. In this operation, the ECU 7 sets the feedback amount of the high-pressure EGR valve 52 at zero. Therefore, in step S405, the ECU 7 substantially does not feedback-control the high-pressure EGR valve 52, and feedback-controls only the low-pressure EGR valve 63.

In this embodiment, the ECU 7 substantially open-controls the high-pressure EGR valve 52 in the EGR control range where only the low-pressure EGR is recirculated, by setting the control gain of the high-pressure EGR valve 52 at zero. Therefore, the EGR control can be simplified.

The ECU 7 sets the proportional gain and the integral gain of the low-pressure EGR valve 63 at zero in the EGR control range where only the high-pressure EGR is recirculated.

The above processings such as calculations and determinations are not limited being executed by the ECU 7. The control unit may have various structures including the ECU 7 shown as an example.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An exhaust recirculation apparatus for an internal combustion engine, the exhaust recirculation apparatus comprising:

a high-pressure EGR passage branching from an exhaust system of the internal combustion engine for recirculating exhaust gas to an intake system of the internal combustion engine;

a high-pressure EGR regulating unit for controlling a flow amount of exhaust gas recirculated through the high-pressure EGR passage;

a low-pressure EGR passage branching from downstream of the high-pressure EGR passage in the exhaust system for recirculating exhaust gas to the intake system;

a low-pressure EGR regulating unit for controlling a flow amount of exhaust gas recirculated through the low-pressure EGR passage; and a control unit for controlling the high-pressure EGR regulating unit and the low-pressure EGR regulating unit, wherein the control unit feedback-controls one of the high-pressure EGR regulating unit and the low-pressure EGR regulating unit, and open-controls an other of the high-pressure EGR regulating unit and the low-pressure EGR regulating unit, in a combination EGR range, in which exhaust gas is recirculated through the high-pressure EGR passage and the low-pressure EGR passage, wherein the control unit determines the high-pressure EGR regulating unit to be abnormal when the amount of exhaust gas recirculation through the high-pressure EGR passage is out of a normal flow range, and the control unit determines the low-pressure EGR regulating unit to be abnormal when the amount of exhaust gas recirculation through the low-pressure EGR passage is out of a normal flow range.

2. The exhaust recirculation apparatus according to claim 1, wherein the control unit feedback-controls the high-pressure EGR regulating unit in the combination EGR range.

3. The exhaust recirculation apparatus according to claim 1, further comprising:
a collecting device provided in the exhaust system for collecting particulate matter contained in exhaust gas,
wherein the low-pressure EGR passage branches from downstream of the collecting device.

4. The exhaust recirculation apparatus according to claim 1,
wherein the high-pressure EGR regulating unit is a valve for communicating and blocking the high-pressure EGR passage,
the low-pressure EGR regulating unit is a valve for communicating and blocking the low-pressure EGR passage,
the control unit stores a throttle-flow information item defining a relationship between the throttle position of the high-pressure EGR regulating unit and an amount of exhaust gas recirculation,
the throttle-flow information item further defines a relationship between the throttle position of the low-pressure EGR regulating unit and an amount of exhaust gas recirculation, and
the control unit obtains a target throttle position of the high-pressure EGR regulating unit in an open control in accordance with a target amount of exhaust gas recirculation in reference to the throttle-flow information item, and
the control unit obtains a target throttle position of the low-pressure EGR regulating unit in an open control in accordance with a target amount of exhaust gas recirculation in reference to the throttle-flow information item.

5. The exhaust recirculation apparatus according to claim 4, wherein when the throttle position of one of the high-pressure EGR regulating unit and the low-pressure EGR regulating unit is in a full close position, the control unit obtains a relationship between an actual throttle position of an other of the high-pressure EGR regulating unit and the low-pressure EGR regulating unit and an actual amount of exhaust gas recirculation to correct the throttle-flow information item relevant to the other of the high-pressure EGR regulating unit and the low-pressure EGR regulating unit.

6. The exhaust recirculation apparatus according to claim 4,
wherein the control unit stores initial values of the throttle positions of the high-pressure EGR regulating unit and the low-pressure EGR regulating unit as the throttle-flow information item for each operating condition of the internal combustion engine,
the control unit obtains at least one of:
a deviation between an initial value of the throttle position and an actual throttle position of one of the high-pressure EGR regulating unit and the low-pressure EGR regulating unit, which is being feedback-controlled; and
a feedback correction amount of the one of the high-pressure EGR regulating unit and the low-pressure EGR regulating unit, which is being feedback-controlled,
wherein the control unit obtains a target throttle position of the high-pressure EGR regulating unit in an open control and a target throttle position of the low-pressure EGR regulating unit in an open control in accordance with at least one of the deviation and the feedback correction amount in reference to the throttle-flow information item.

7. The exhaust recirculation apparatus according to claim 5, wherein the control unit calculates the actual amount of exhaust gas recirculation by subtracting an intake air amount from a total intake gas amount by which a combustion chamber of the internal combustion engine draws gas.

8. The exhaust recirculation apparatus according to claim 7, wherein the control unit calculates the total intake gas amount in accordance with a rotation speed, an intake air pressure, and intake air temperature of the internal combustion engine.

9. The exhaust recirculation apparatus according to claim 4, wherein when the throttle position of one of the high-pressure EGR regulating unit and the low-pressure EGR regulating unit is in a full close position, and the control unit feedback-controls an other of the high-pressure EGR regulating unit and the low-pressure EGR regulating unit, the control unit obtains the relationship between an actual throttle position of the other of the high-pressure EGR regulating unit and the low-pressure EGR regulating unit and an actual amount of exhaust gas recirculation.

10. The exhaust recirculation apparatus according to claim 4,
wherein when the throttle position of one of the high-pressure EGR regulating unit and the low-pressure EGR regulating unit is in a full close position, and the control unit feedback-controls an other of the high-pressure EGR regulating unit and the low-pressure EGR regulating unit, the control unit obtains the relationship between the actual throttle position of the other of the high-pressure EGR regulating unit and the low-pressure EGR regulating unit and an actual amount of exhaust gas recirculation, and
when the control unit switches the other of the high-pressure EGR regulating unit and the low-pressure EGR regulating unit to an open control, the control unit corrects the throttle-flow information item relevant to the other of the high-pressure EGR regulating unit and the low-pressure EGR regulating unit.

11. The exhaust recirculation apparatus according to claim 1,
wherein the control unit terminates a control of at least one of the high-pressure EGR regulating unit and the low-pressure EGR regulating unit, which is determined to be abnormal, and
the control unit feedback-controls at least one of the high-pressure EGR regulating unit and the low-pressure EGR regulating unit, which is determined to be normal.

12. A method for controlling recirculation of exhaust gas of an internal combustion engine, the method comprising:
recirculating high-pressure exhaust gas from an exhaust system of the internal combustion engine to an intake system of the internal combustion engine through a high-pressure EGR passage simultaneously with recirculating low-pressure exhaust gas from downstream of the high-pressure EGR passage in the exhaust system to the intake system through a low-pressure EGR passage; and
feedback-controlling one of a flow amount of the high-pressure exhaust gas and a flow amount of the low-pressure exhaust gas simultaneously with open-controlling an other of the flow amount of high-pressure exhaust gas and the flow amount of low-pressure exhaust gas by using a high-pressure EGR regulating unit and a low-pressure EGR regulating unit;
determining the high-pressure EGR regulating unit to be abnormal when the amount of the high-pressure exhaust gas recirculation through the high-pressure EGR passage is out of a normal flow range, and determining the low-pressure EGR regulating unit to be abnormal when the amount of the low-pressure exhaust gas recirculation through the low-pressure EGR passage is out of a normal flow range.

* * * * *